Patented Nov. 5, 1929

1,734,789

UNITED STATES PATENT OFFICE

JAMES BADDILEY, PERCY DOOTSON, ARNOLD SHEPHERDSON, AND SIDNEY THORNLEY, OF BLACKLEY, MANCHESTER, ENGLAND, ASSIGNORS TO BRITISH DYESTUFFS CORPORATION LIMITED, OF BLACKLEY, MANCHESTER, ENGLAND

MANUFACTURE OF NEW DYESTUFFS

No Drawing. Application filed February 2, 1928, Serial No. 251,456, and in Great Britain February 8, 1927.

This invention relates to new dyestuffs of the anthracene series and methods of producing the same.

The new dyes are products made by condensing flavanthrone derivatives, containing a nitrogen atom to which a reactive hydrogen atom is attached, with polynuclear aromatic halogen compounds having a ring system of three or more fused nuclei.

Such flavanthrone derivatives taken for condensation are aminoflavanthrones made by nitration and reduction of flavanthrone (Holdermann and Scholl, Berichte, 1910, 43, 340), and also the products obtained by the action of hydroxylamine on flavanthrone as described in the specification of Letters Patent No. 1,662,872.

The halogenated substance which we may use for condensation include halogenated acenaphthaquinones, halogenated flavanthrones, halogenated pyranthrones, and the like. They may contain solubilizing groups such as carbonyl or sulphonic groups, in which case soluble dyes may be obtained suitable for dyeing wool or silk. In the absence of such solubilizing groups we obtain vat dyes, usually of a valuable brown shade. The following example illustrates our invention without limiting it, the parts being by weight.

Example.—Mix together in the cold 2.2 parts of the product obtained by the action of hydroxylamine on flavanthrone, 6.3 parts of dibrom pyranthrone, 2.0 parts of anhydrous sodium acetate, 1.5 parts of copper acetate, 75 parts of nitrobenzene. Raise the temperature of the mixture with stirring to 200° C. and maintain a temperature of 200–210° C. for 20 hours. Cool the reaction mixture, filter, and wash the filter cake with cold nitrobenzene, benzene, and hot water. Dry the washed filter cake. The new product is a brown powder giving a blue colour when dissolved in 94 per cent sulphuric acid, and dyeing cotton strong brown shades from aqueous sodium hydrosulphite alkali vat. The colour of the vat is bluish-violet.

What we claim and desire to secure by Letters Patent is:—

1. A process for the manufacture of new dyes which comprises condensing an amino derivative of flavanthrone with halogenated polynuclear aromatic compounds having three or more nuclei.

2. A process for the manufacture of new vat dyes which comprises condensing an amino derivative of flavanthrone with a halogenated pyranthrone.

3. A process for the manufacture of a new vat dye which comprises reacting the product obtained by the action of hydroxylamine on flavanthrone, with dibrompyranthrone, anhydrous sodium acetate and copper acetate, in presence of nitrobenzene.

4. The dyestuff obtained by the process of claim 3, which is a brown powder giving a blue colour when dissolved in 94 per cent sulphuric acid, and dyeing cotton strong brown shades from aqueous sodium hydrosulphite alkali vat, the colour of the vat being bluish-violet.

In testimony whereof we affix our signatures.

JAMES BADDILEY.
PERCY DOOTSON.
ARNOLD SHEPHERDSON.
SIDNEY THORNLEY.